(12) United States Patent
Yun et al.

(10) Patent No.: US 10,641,662 B2
(45) Date of Patent: May 5, 2020

(54) METHOD FOR ESTIMATING GEOTHERMAL GRADIENT AND DEVICE FOR ESTIMATING GEOTHERMAL GRADIENT

(71) Applicant: Korea Electric Power Corporation, Naju-si, Jeollanam-do (KR)

(72) Inventors: Kwan Hee Yun, Daejeon (KR); Jung Tak Shim, Daejeon (KR); Eun Ju Jung, Daejeon (KR)

(73) Assignee: Korea Electric Power Corporation, Naju-si (KR)

( * ) Notice: Subject to any disclaimer, the term of this patent is extended or adjusted under 35 U.S.C. 154(b) by 213 days.

(21) Appl. No.: 16/065,298

(22) PCT Filed: Aug. 24, 2016

(86) PCT No.: PCT/KR2016/009386
§ 371 (c)(1),
(2) Date: Jun. 22, 2018

(87) PCT Pub. No.: WO2017/111253
PCT Pub. Date: Jun. 29, 2017

(65) Prior Publication Data
US 2019/0078944 A1 Mar. 14, 2019

(30) Foreign Application Priority Data
Dec. 24, 2015 (KR) .................. 10-2015-0185756

(51) Int. Cl.
*G01K 13/10* (2006.01)
*G01V 1/30* (2006.01)
(Continued)

(52) U.S. Cl.
CPC ............ *G01K 13/10* (2013.01); *E21B 47/065* (2013.01); *G01V 1/00* (2013.01); *G01V 1/28* (2013.01);
(Continued)

(58) Field of Classification Search
None
See application file for complete search history.

(56) References Cited

U.S. PATENT DOCUMENTS 3,975,674 A 8/1976 McEuen
4,008,608 A 2/1977 Reynolds
(Continued)

FOREIGN PATENT DOCUMENTS

JP 09236075 A 9/1997
KR 20090078501 A 7/2009
(Continued)

OTHER PUBLICATIONS

Yoonho Song et al, Estimation of Theoretical and Technical Potentials of Geothermal Power Generation using Enhanced Geothermal System, 2011, p. 513-523, 44(6), The Korean Society of Economic and Environmental Geology, Kongju, Republic of Korea.
(Continued)

*Primary Examiner* — Paresh Patel
(74) *Attorney, Agent, or Firm* — Foudation Law Group LLP; Kwang Jun Kim; J D Harriman

(57) ABSTRACT

The present invention relates to a method for estimating a geothermal gradient and an apparatus for estimating a geothermal gradient, and provides a method for estimating a geothermal gradient, the method comprising the steps of: calculating, at each of a plurality of points, a seismic wave crustal attenuation characteristic parameter of a seismic wave measured on the basis of the measured seismic wave information, with respect to the plurality of points; deriving an artificial neural network relational formula on the basis of the seismic wave crustal attenuation characteristic parameter; and calculating a geothermal gradient of an area of interest excluding the plurality of points on the basis of the artificial neural network relational formula, such that the geothermal gradient is estimated at a low cost by using a highly reliable method.

13 Claims, 12 Drawing Sheets

(51) Int. Cl.
*G06N 3/08* (2006.01)
*G01V 1/28* (2006.01)
*G01V 1/00* (2006.01)
*G06F 17/18* (2006.01)
*E21B 47/06* (2012.01)
*G01V 9/00* (2006.01)

(52) U.S. Cl.
CPC ................ *G01V 1/30* (2013.01); *G01V 9/005* (2013.01); *G06F 17/18* (2013.01); *G06N 3/08* (2013.01)

(56) References Cited

U.S. PATENT DOCUMENTS

| | | |
|---|---|---|
| 2012/0057614 A1 | 3/2012 | Normann |
| 2014/0256055 A1* | 9/2014 | Pottorf .................... G01N 1/00 436/163 |

FOREIGN PATENT DOCUMENTS

| | | |
|---|---|---|
| KR | 20110015169 A | 2/2011 |
| KR | 101475371 B | 12/2014 |
| KR | 20150035633 A | 4/2015 |

OTHER PUBLICATIONS

Hyungchan Kim, Interpretation of geothermal anomaly using heat flow and geological data in South Korea, journal, 2004.2, p. 80-86, Chungnam National University, Daejeon, Republic of Korea.

* cited by examiner

METHOD FOR ESTIMATING GEOTHERMAL GRADIENT AND DEVICE FOR ESTIMATING GEOTHERMAL GRADIENT

TECHNICAL FIELD

The present invention relates to a method for estimating a geothermal slope gradient and a device for estimating a geothermal gradient and, particularly, to a method and device for estimating a geothermal gradient at a deep area using crustal characteristic parameters of a seismic wave.

BACKGROUND ART

Two site conditions, geothermal temperature and geothermal heat flow, are required to generate electricity using geothermal heat, which is a new and renewable energy. The higher the geothermal temperature and the more the geothermal heat flow, the larger and the more economical geothermal power generation is possible. The geothermal temperature is a condition that cannot be artificially produced, but is naturally generated, and is a necessary condition for geothermal power generation.

In general, the deeper under the ground, the higher the temperature due to the heat of the mantle under the crustal. This increasing rate is called a geothermal gradient (° C./km). It is possible to measure the geothermal temperature (ground temperature) of deep parts using the geothermal gradient. The geothermal gradient can be obtained from the following equation:

geothermal temperature=geothermal gradient×depth+ earth surface temperature.

Geothermal heat flow calculated from a geothermal gradient and heat conductivity measured at a specific point is representative geothermal heat flow of the corresponding area, but there is a problem with how the geothermal heat flow is reliable as the representative value at the point.

In general, the geothermal temperatures for each depth measured through an exploratory hole have changes at each depth, but the geothermal gradient values may be understood as geothermal temperatures approximated to values that simply increase at each depth. Furthermore, when several geothermal gradient values are shown in a narrow area, a representative value was simplified to an average value regardless of degree of quality of the geothermal gradient values. Furthermore, the depth of measuring geothermal temperature through an exploratory hole is within hundreds of meters, so the reliability of geothermal gradient values of deep parts is not high. It is required to bore a hole to several kilometers in order to estimate an exact geothermal gradient value, but the expensive is high in this case.

Furthermore, it is possible to estimate the geothermal temperature of a point where geothermal temperature was not measured, using geothermal temperatures measured at various points, but meaningful estimation may be impossible when the spatial density of the measured values is low or is not uniform.

In the geothermal resource distribution map that is generally used now for power generation from deep parts in Korea, data measured at 352 biased points (spa zones over 70%) are spatially smoothened (Non-Patent Document, Estimation of Theoretical and Technical Potentials of Geothermal Power Generation using Enhanced Geothermal System, Economy and Environment Geology, V. 44, N. 6, 513-523, 2011, Yoonho Song et al.) However, in this spatial smoothing, the crustal characteristics relating to the geothermal characteristics of deep parts are never considered, so it is meaningless to estimate geothermal heat through spatial smoothing that uses arbitrary parameters with geothermal measurement data biased to spa zones.

In order to overcome the limit in this geothermal estimation method, geothermal heat flow in Korean has been estimated by selecting the kinds of rocks, the generation age of geological stratums, and the depth of the Moho plane as earth science information relating to geothermal heat flow, by classifying the information in specific ranges, by calculating the average geothermal heat flow in each of the ranges, and by using the following geothermal heat flow equation Qs (Interpretation of geothermal anomaly using heat flow and geological data in South Korea, p. 80-86 doctoral dissertation, applied geology, geology department, graduate course, ChungNam Univ., 2004, 2, KIM, Hyung Chan).

$Qs$=average of geothermal heat flow for each kind of rock+average of geothermal heat flow for each geological age+average of geothermal heat flow for each depth of Moho plane However, the geothermal heat flow distribution estimated by this method shows zoning in which the values are all the same in a specific zone and there is no quantitative data that prove the relationship between the estimated result and the actually measured geothermal heat flow.

(Non-Patent Document 1) Non-Patent Document 1: Estimation of Theoretical and Technical Potentials of Geothermal Power Generation using Enhanced Geothermal System, Economy and Environment Geology, 44th Vol., 6 issue, 513-523, 2011, Yoonho Song et al.

(Non-Patent Document 2) Non-Patent Document 2: Interpretation of geothermal anomaly using heat flow and geological data in South Korea, p. 80-86 doctoral dissertation, applied geology, geology department, graduate course, ChungNam Univ., 2004, 2, KIM, Hyung Chan

DISCLOSURE

Technical Problem

As described above, the geothermal gradient data that were used to estimate geothermal heat flow in the related art is concentrated on specific zones, so the geothermal resource distribution map constructed by spatially smoothing the distribution was low in reliability. Further, even the measured data were low in representation for a specific point and in reliability due to several reasons such as a small depth of an exploratory hole, existence of duplicate data for the same point, and the possibility of distortion of measured data by the water of a spa. Furthermore, boring a deep exploratory hole in order to improve the representation or reliability of measured data incurs high cost.

An object of the present invention is to enable promotion of reasonably geothermal power generation by allowing for quantitative estimation of geothermal heat flow by estimating a geothermal gradient using a method that is inexpensive and has high reliability.

Technical Solution

In order to achieve the objects of the present invention, according to embodiments of the present invention, there is provided a method for estimating a geothermal gradient, the method comprising: calculating a seismic wave crustal attenuation characteristic parameter of a measured seismic wave at each of a plurality of points on the basis of seismic wave information measured for the plurality of points; deriving an artificial neural network relational formula on the basis of the seismic wave crustal attenuation characteristic parameter; and calculating a geothermal gradient of an interesting area except for the positions on the basis of the artificial neural network relational formula.

The calculation of a seismic wave crustal attenuation characteristic parameter may calculate $Q_0$ and a frequency dependence value $\eta$ at a geometrical location and an in-crust depth of an area where the seismic wave information was measured, through a spectrum and a Q tomography inversion method based on the measured seismic wave information when anelastic attenuation of a seismic wave is modeled into $Q(f)=Q_0 f^\eta$.

A dependency difference $\eta\_diff$ ($\eta\_diff=\eta-\eta'$) that is a difference between an estimation value of the frequency dependency value calculated from a function $F_\eta(Q_0)$ between the $Q_0$ and frequency dependency value $\eta$ calculated by the Q tomography inversion method and the frequency independency value $\eta$ calculated by the Q tomography inversion method may be additionally calculated in the calculation of a seismic wave crustal attenuation characteristic parameter.

The method may further include calculating at least any one of a topographic characteristic parameter a crustal heterogeneity parameter about the area of interest as the earth science information, and the deriving of an artificial neural network relational formula may derive the artificial neural network relational formula by further including at least any one of the calculated topographic characteristic parameter or crustal heterogeneity parameter.

The topographic characteristic parameter may include at least any one of a height, a relative height, a slope, and roughness table for earth surface of the area of interest.

The crustal heterogeneity parameter may include at least any one of a mantle depth and a crustal property of the area of interest.

The deriving of an artificial neural network relational formula may drive the artificial neural network relational formula by using the seismic wave crustal attenuation characteristic parameter, the topographic characteristic parameter, and the crustal heterogeneity parameter about the plurality of points as input of the artificial neural network relational formula and by using geothermal gradients measured for the plurality of points as output; and the calculation of a geothermal gradient may calculate a geothermal gradient of the area of interest by calculating a seismic wave crustal attenuation characteristic parameter, a topographic characteristic parameter, and a crustal heterogeneity parameter at the area of interest and substituting the parameters into the derived artificial neural network relational formula.

In order to achieve the objects of the present invention, according to embodiments of the present invention, there is provided a method for estimating a geothermal gradient, the method including: configuring an artificial neural network relational formula by using a seismic wave crustal attenuation characteristic parameter, a topographic characteristic parameter, and a crustal heterogeneity parameter calculated about a plurality of points as input of the artifical neural network and by using geothermal gradients measured for the plurality of points as output of the artificial neural network; calculating artificial neural network relational formulae, in which a relationship between the measured geothermal gradients and a geothermal gradient value calculated on the basis of an artificial neural network satisfies a predetermined condition, as much as a predetermined number; calculating a plurality of geothermal gradient estimation values by inputting a seismic wave crustal attenuation characteristic parameter, a topographic characteristic parameter, and a crustal heterogeneity parameter at an area of interest except for the plurality of joints, into the calculated artificial neural network relational formulae; and calculating a final geothermal gradient estimation value by calculating a statistic value for the plurality of geothermal gradient estimation values.

The method may further include calculating a linear regression formula between the measured geothermal gradient values and geothermal gradient values calculated by inputting the parameters at the plurality of points into the calculated artificial neural network relational formulae.

The predetermined condition may mean that an error between the measured geothermal gradient and a geothermal gradient calculated on the basis of an artificial neural network is a first reference value or less.

The predetermined condition may mean that a correlation coefficient for a geothermal gradient value calculated by an artificial neural network relational formula having a minimum error of an artificial neural network relational formulae satisfying the condition that the error is the first reference value or less.

The predetermined condition may mean that a correlation coefficient for a geothermal gradient value calculated by an artificial neural network relational formula having a minimum error of a plurality of artificial neural network relational formulae calculated by artificial neural network repetitive learning is a second reference value or less.

In order to achieve the objects of the present invention, according to embodiments of the present invention, there is provided a device for estimating a geothermal gradient, the device including: a parameter extraction unit extracting a parameter showing a characteristic of input information; an artificial neural network relational formula calculation unit calculating an artificial neural network relational formula having the parameter calculated by the parameter extraction unit as input; and a geothermal gradient estimation unit calculating a geothermal gradient estimation value by inputting parameters at an area of interest extracted by the parameter extraction unit into an artificial neural network relational formula calculated by the artificial neural network relational formula calculation unit, in which the parameter extracted by the parameter extraction unit includes a seismic wave crustal attenuation characteristic parameter, a topographic characteristic parameter, and a crustal heterogeneity parameter, and the artificial neural network relational formula calculation unit calculates the artificial neural network relational formula on the basis of parameters extracted at a plurality of points by the parameter extraction unit and geothermal gradients measured at the plurality of points.

Advantageous Effects

By the configurations described above, it is possible to estimate a geothermal gradient using a highly reliable method at a low cost.

MODE FOR INVENTION

Figure 1:
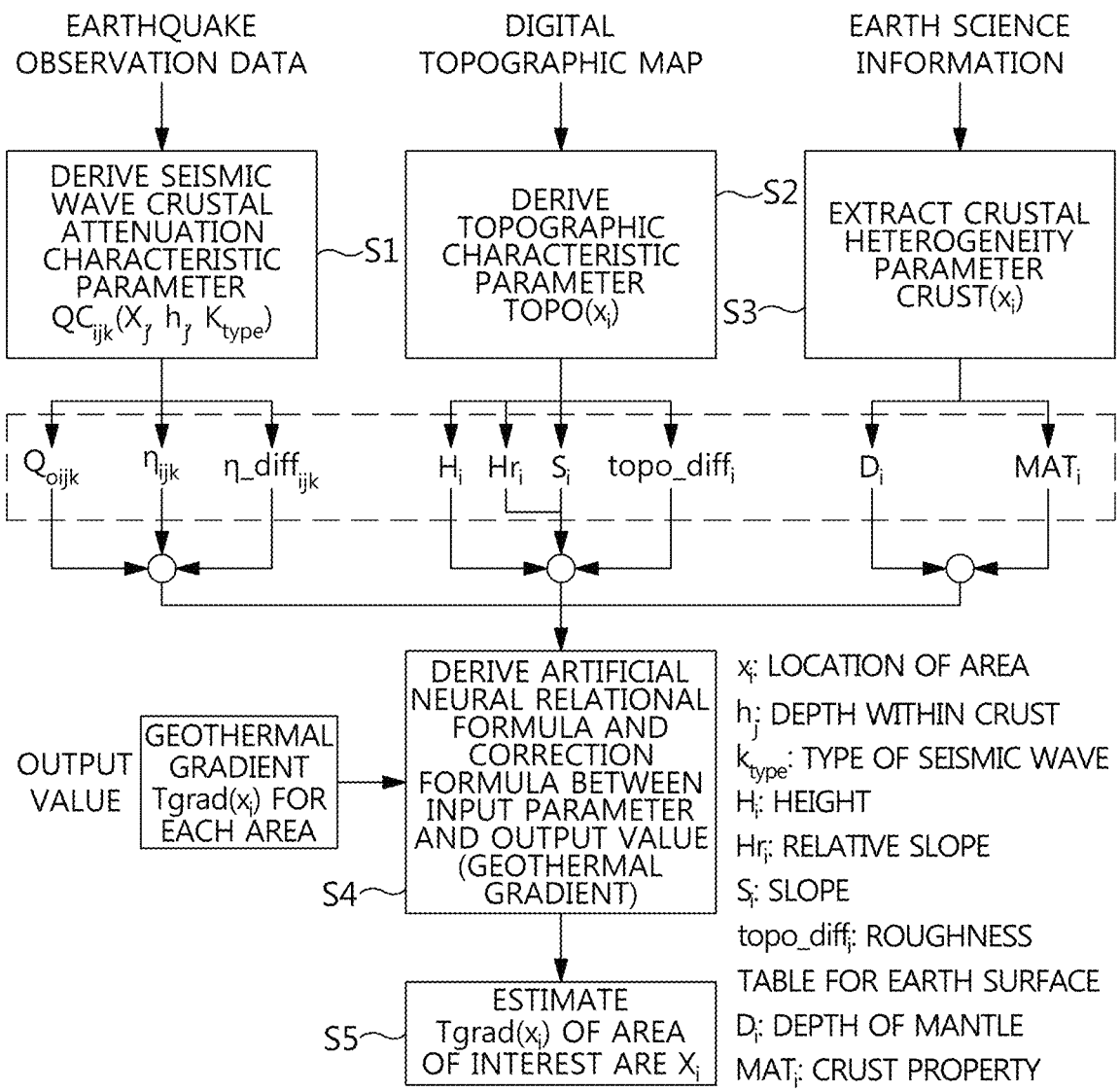
FIG. 1 is a view illustrating a method for estimating a geothermal gradient according to an embodiment of the present invention.

The present invention may be modified in various ways and implemented by various exemplary embodiments, so that specific exemplary embodiments are shown in the drawings and will be described in detail. However, it is to be understood that the present invention is not limited to the specific exemplary embodiments, but includes all modifications, equivalents, and substitutions included in the spirit and the scope of the present invention. In describing the present invention, detailed descriptions of well-known technologies will be omitted so as not to obscure the description of the present invention with unnecessary detail The terminologies used herein are for the purpose of describing particular embodiments only and are not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Hereinafter, embodiments of the present invention are described in detail with reference to accompanying drawings, and in the following description of the accompanying drawings, like reference numerals are given to like components and repetitive description is omitted.

The inventor(s) has taken notice of additionally using earth science information that may be associated with geothermal heat, in order to reduce uncertainty related to estimation a geothermal gradient and solve a problem of low non-uniform spatial density. If the relationship between earth science information and geothermal temperature is determined, it is possible to propose a representative geothermal temperature value for a point having a duplicate geothermal temperature, using only the earth science information, and it is also possible to reasonably estimate a geothermal temperature information even for a specific point in which the spatial density of geothermal temperature values is low. Hereafter, a method for estimating a geothermal gradient unit earth science information, particularly, earthquake observation data.

FIG. 1 is a view illustrating a method for estimating a geothermal gradient according to an embodiment of the present invention.

Referring to FIG. 1, a method for estimating a geothermal gradient according to this embodiment is used to estimate a geothermal gradient using earthquake observation data. Other than the earthquake observation data, a digital topographic map and other earth science information can be used to estimate a geothermal gradient.

The earth science information that may relate to geothermal temperature (or a relevant, geothermal) may be seismic wave attenuation. The seismic wave attenuation is classified into geometrical attenuation due to spatial energy propagation of a seismic wave according to a seismic center distance to a seismic source and Q attenuation due to anelastic property on a propagation path. Anelastic attenuation due to Q is modeled in $Q(f)=Q_0 f^\eta$ (f is a frequency) and is generally explained as including intrinsic attenuation and scattering attenuation. The scattering attenuation is closely connected with frequency dependency $\eta$ of Q and $\eta$ is in proportion to the degree of heterogeneity. The intrinsic attenuation, which is not related to a frequency, and is known as being in associated with a geothermal amount of an area.

As described above, it can be seen that a seismic wave propagation characteristic that is important for geothermal estimation using a seismic wave is $Q_0 f^\eta$, particularly $Q_0$. Further, as a characteristic of a seismic wave related to a geothermal characteristic, there may be a speed and a poison ration. Meanwhile, in order to estimate $Q_0$ from earthquake observation data, the frequency dependency $Q_0$ of Q should also be estimated. Considering the heterogeneity of a crustal that determines $\eta$, the earth science information is geometrical information such as a ground curve, a slope, an absolute height, and a relative height. Q that is estimated using a seismic wave propagating over 100 Km may be in close connection with the thickness of the crustal on the propagation path, that is, the depth of a Moho plane.

On the basis of this fact, first, seismic wave crustal attenuation characteristic parameters are derived using earthquake observation data (S1). The earthquake observation data may be directly measured data, or data measured at areas may be received through wired/wireless communication, or measured data may be stored in a storage medium and used. The seismic wave crustal attenuation characteristic parameters derived in step S1 are $Q_{0ijk}$, $\eta_{ijk}$, $\eta\_diff_{ijk}$.

Figure 2:
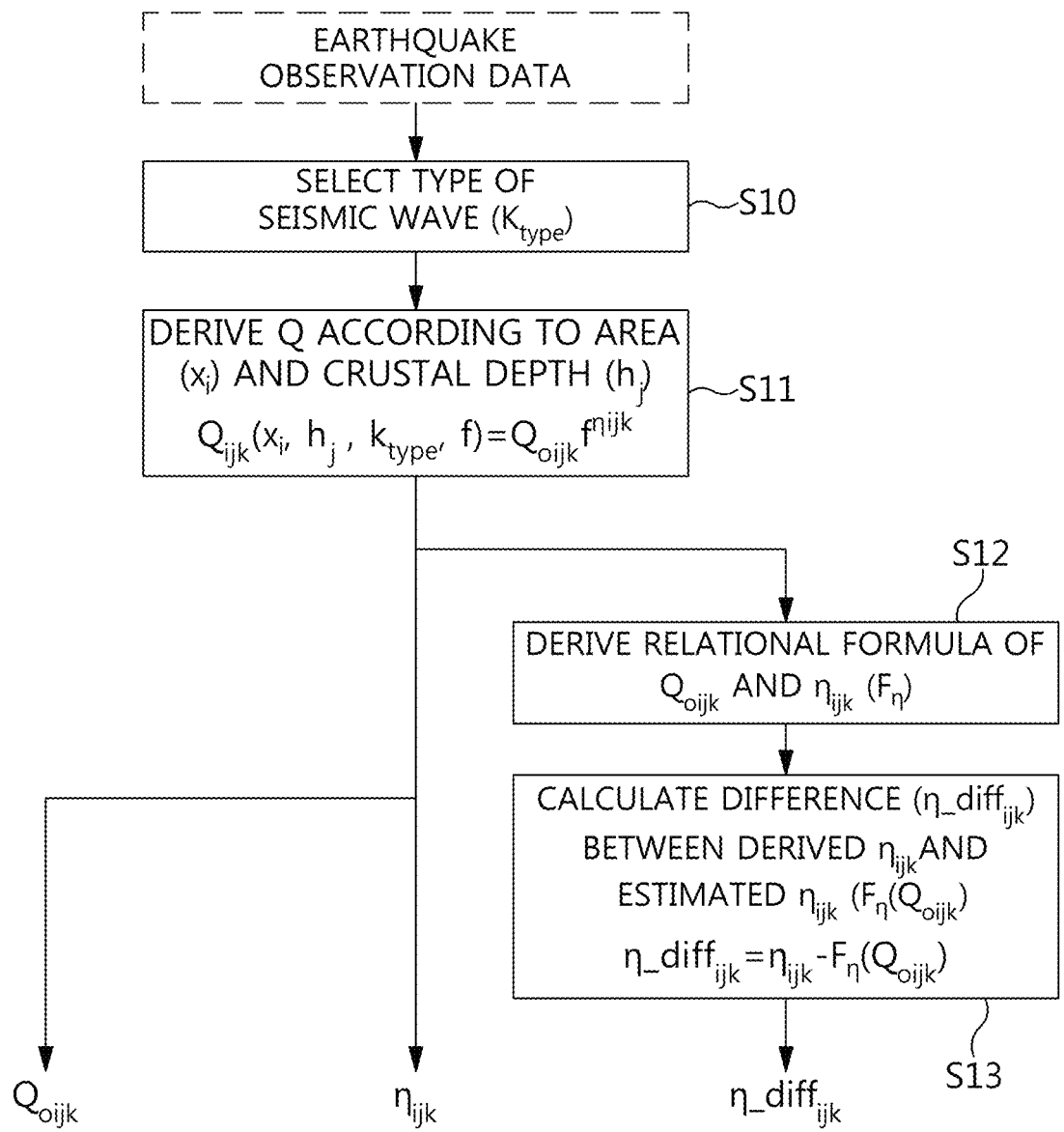
FIG. 2 is a view illustrating a method for deriving seismic wave crustal attenuation characteristic parameters in accordance with an embodiment of the present invention.

The method for deriving seismic wave crustal attenuation characteristic parameters is described in more detail with reference to FIG. 2. FIG. 2 is a view illustrating a method for deriving seismic wave crustal attenuation characteristic parameters in accordance with an embodiment of the present invention.

First, the type $k_{type}$ of a seismic wave (P-wave, S-wave, coda wave, Lg wave etc.) is selected from the earthquake observation data. $Q_0$ and $\eta$ for each area $x_i$ and depth under a crustal are calculated using a spectrum and a Q tomography inversion method for the selected type of a seismic wave. This can be expressed as follows.

$$Q_{ijk}(x_i, h_j, k_{type}, f) = Q_{0ijk} * f^{\eta_{ijk}}$$

The calculated, parameters are $Q_{0ijk}$ and $\eta_{ijk}$.

When several $Q_{0ijk}$ and $\eta_{ijk}$ are calculated for areas and depths, $F_\eta(Q_0)$ that is a relational formula of $Q_{0ijk}$ and $\eta_{ijk}$ can be calculated (S12). Thereafter, $\_diff_{ijk}$ ($\eta\_diff_{ijk}=\eta_{ijk}-F_\eta(Q_{0ijk})$) that is the difference between the $n_{ijk}$ obtained by substituting $Q_{0ijk}$ into $F_\eta(Q_0)$ and $\eta_{ijk}$ directly estimated through the Q topography.

In this method, $\eta_{ijk}$, $\eta\_diff_{ijk}$ are calculated as seismic wave crustal attenuation characteristic parameters.

Next, derivation of topographic characteristic parameters showing characteristics earth surface terrains is described.

Referring back to FIG. 1, in the method for estimating geothermal temperature according to this embodiment, topographic characteristic parameters are derived using a digital topographic map (S2). A crustal heterogeneity parameter is additionally extracted using other earth science information other than the earthquake observation data or the digital topographic map (S3). This is because, as described above, seismic wave crustal attenuation characteristic parameters are influenced by the earth surface terrain or crustal heterogeneity. That is, in order to derive a relational formula for estimating a high-reliable geothermal gradient, it is required to input both of earth surface terrain and crustal heterogeneity.

Figure 3:
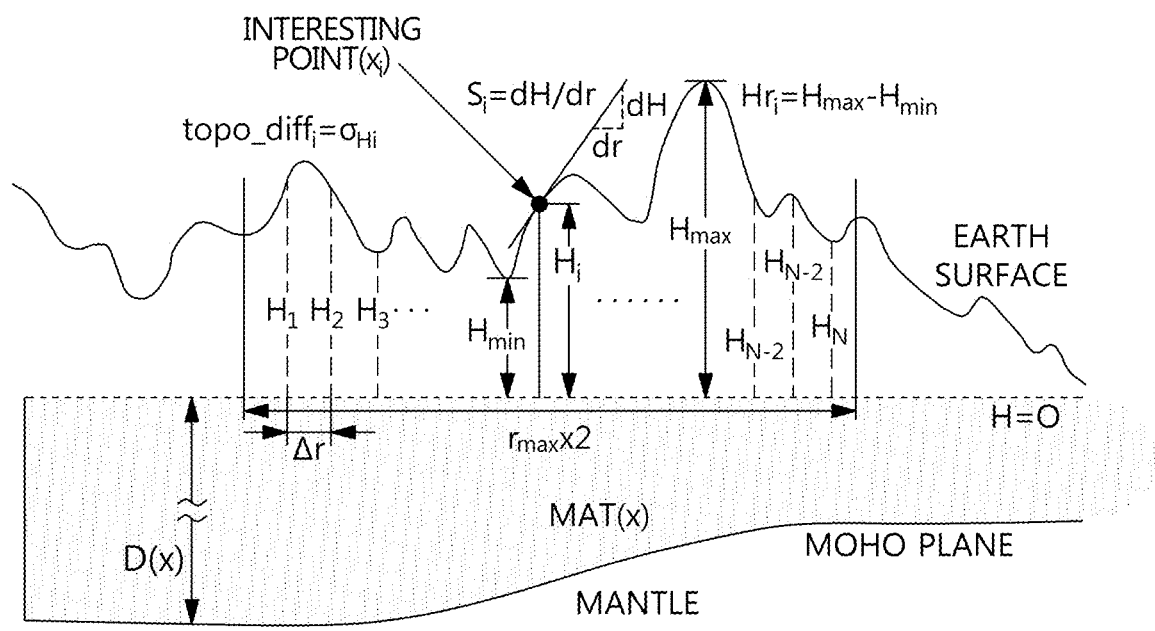
FIG. 3 is a view illustrating a method for calculating parameters based on topographic characteristic and crustal heterogeneity of an area of interest.

A method for calculating parameters based on characteristics of terrains and crustal heterogeneity is described in detail with reference to FIG. 3. FIG. 3 is a view illustrating a method for calculating a parameter based on a topographic characteristic and crustal heterogeneity of an area of interest.

As crustal heterogeneity parameters, an area of interest $x_i$, a relative height, a slope, and roughness of earth surface, etc. can be derived. The relative height is a height difference between the maximum height and the minimum height within a predetermined distance (an $r_{max}$ radius in this embodiment). The roughness of an earth surface shows standard deviation of the heights within a predetermined distance (in this embodiment, standard deviation for heights of points at a distance $\Delta r$ within the radius). However, in this embodiment, the absolute height, relative height, slope, roughness of an earth surface were used, they are example and the present invention is not limited thereto. For example, it may be possible to use only some of the absolute height, relative height, slope, roughness of an earth surface or it may also be possible to use other parameters not stated herein.

In the method, $H_i$, $Hr_i$, $S_i$, and Topo_diff$_i$ are calculated as the topographic characteristic parameters.

Meanwhile, as the crustal heterogeneity parameters, the mantle depth and the crustaly property of the area of interest $x_i$ may be derived. As the crustal heterogeneity parameters, directly measured values may be used or various items of earth science information published through documents, dissertations, reports, etc. and quantified for known areas may be used. In this embodiment although the mantle depth and crustal property were used, they are only example and the present invention is not limited thereto. For example, it may be possible to use only some of the mantle depth and crustal property or it may also be possible to use other parameters not stated herein.

$D_i$ and $MAT_i$ are calculated as crustal heterogeneity parameters in this way.

Various parameters calculated in steps S1 to S3 are set as input parameters of an artificial neural network and a geothermal slope Tgrad($x_i$) previously measured and known is set as an output value of the artificial neural network, so artificial neural network relational formula and correction formula between the input parameters and the output valve are derived (S4). When the artificial neural network relational formula and correction formula are derived, a geothermal gradient is estimated by inputting the input parameters of a selective area of interest $x_i$ (S5).

Derivation of the artificial neural network relational formula and correction formula is described in detail hereafter.

Figure 4:
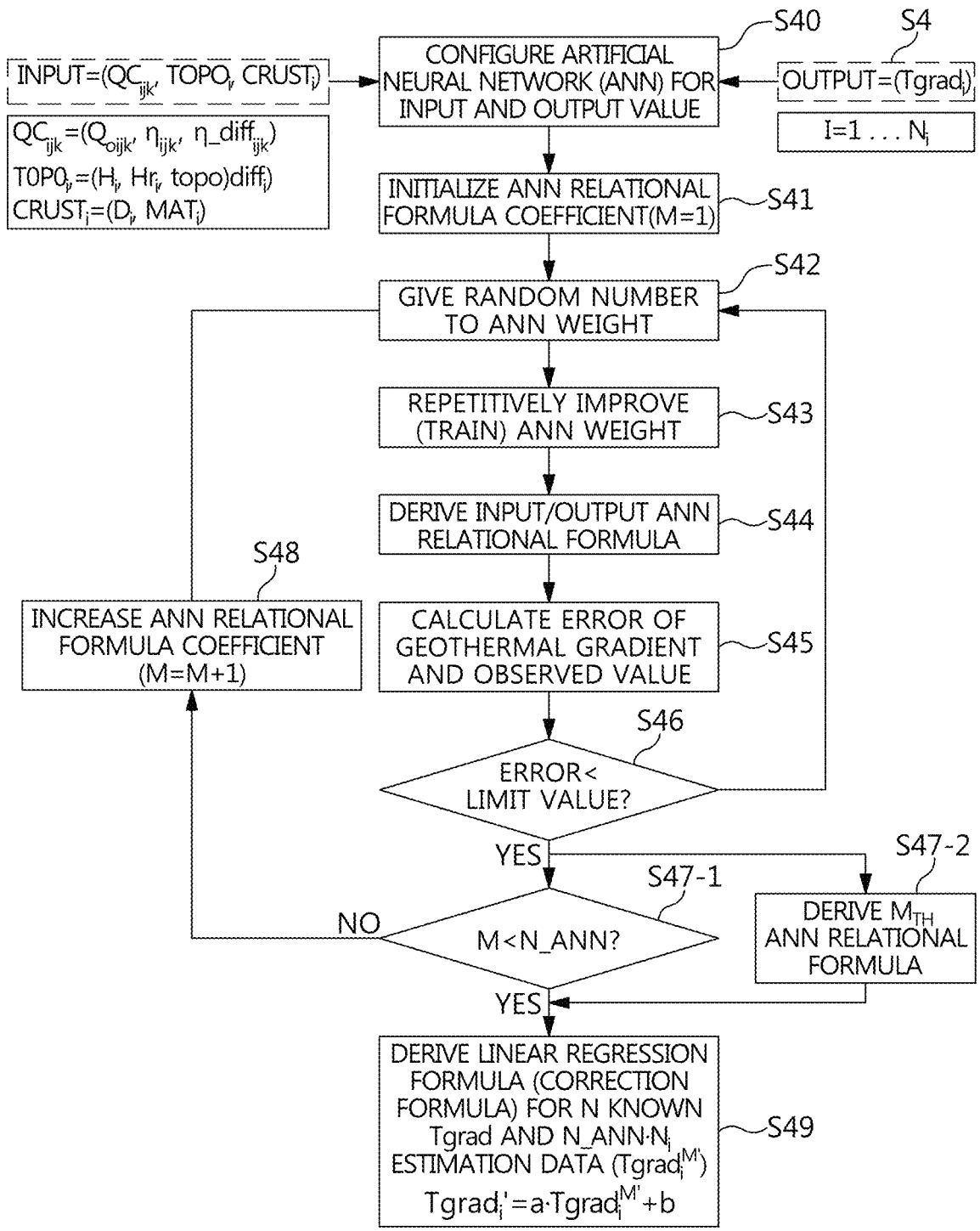
FIG. 4 is a view illustrating a method for deriving an artificial neural network in accordance with an embodiment of the present invention.

FIG. 4 is a view illustrating a method for deriving an artificial neural network in accordance with an embodiment of the present invention.

Referring to FIG. 4, an ANN (Artificial Neural Network) having the input parameters described with reference to FIG. 2 as input and a geothermal gradient as output is configured (S40). The coefficient of the ANN is initialized as M (M=2) (S41).

Estimation of a relational formula of input and output using the ANN is used when the relationship between an input variable and an output value is not clearly known. Estimation of an ANN relational formula is determined as a weight for a plurality of networks composed of 'input parameter layer node—hidden layer node—output layer node' and a relevant function. An interlayer function is previously determined as a linear or non-linear function. A weight that is given to networks configured between all node combinations is randomly given as an initial solution, and a network weight is propagated back such that the difference between an output value known through repetitive calculation and an output valve estimated a relational formula, whereby the final result is proposed. Accordingly, since the output value to be estimated can be changed in accordance with a network weight that is initially randomly given, it is required to repetitively perform an estimation process of an ANN weight function.

Accordingly, a predetermined weight is applied to the network weight of the ANN relational formula configured in step S40 (S42) and training of changing and improving the weight of the ANN relational formula is repeated (S43).

An ANN relational formula for input/output using a network weight is derived every time the network weight is changed (S44) and an error of the difference between an estimated value of a geothermal gradient and an actually measured value of the geothermal gradient is calculated (S45).

When the calculated error is a limit value (reference value) or more, the corresponding relational formula is determined as an inappropriate ANN relational formula to which a weight is not given and the process returns to step S43, whereby changing a network weight and deriving an ANN relational formula are repeated.

On the contrary, when the calculated error is smaller than the limit value (Yes in S46), it is determined that an appropriate ANN relational formula was derived and the corresponding relational formula is extracted as the first (M=1) ANN relational formula (S47-2).

Furthermore, it is determined whether the extracted ANN relational formula has reached a predetermined value (N_ANN), and when it does not yet reach the predetermined value (No in S47-1), the coefficient M of the ANN relational formula is increased by 1 and the process returns to step S42 (S48).

In contrast, when it is determined that the ANN relational formula has reached the predetermined value (Yes in S47-1), a linear regression formula is derived using a total of N_ANN relational formulae extracted until that time. In more detail, N_ANN relational formulae were extracted by the operations in steps s41 to S48. If there are a total of Ni measured geothermal gradient when an ANN is configured, and if the measured geothermal gradients are input for all of N_ANN relational formulae, a total of $N_i$*N_ANN geothermal gradient estimation data Tgrad$_i^{Mi}$ are created. Accordingly, a linear regression formula for Ni geothermal gradient values Tgrad$_i$ and $N_i$*N_ANN geothermal gradient estimation data Tgradi$^{Mi}$ is extracted as follows. Using this linear regress formula, later, it is possible to correct linear bias an error of an estimated value of a geothermal gradient.

$$Tgrad_i' = a * Tgrad_i^{Mi} + b$$

Relational formulae and a correction formula by an ANN are calculated by this method.

In this embodiment, step S45 determines the condition of step S46 is satisfied when errors of estimated geothermal gradients based on the derived ANN relational formula and the actually estimated values for a plurality of points are all a reference value or less, and may derive a corresponding ANN relational formula in step S47-2. Alternatively, when the error of an actually estimated value for a specific point is the reference value or less, it is determined that the condition of step S46 is satisfied, and a corresponding ANN relational formula may be derived in step S47-2.

Meanwhile, in this embodiment, although, as a condition for extracting an ANN relational formula, the case in which the errors of estimated values of geothermal gradients based on an ANN relational formula and observed values are calculated and the errors are the reference value or less, the present invention is not limited thereto.

For example, it may be possible to obtain an ANN relational formula in which a correlation coefficient is a predetermined reference value (e.g., 0.6 or 0.7) or less as an ANN relational formula to be finally extracted, by extracting ANN relational formulae having an error, which is a reference value or less, more than N_ANN, which is a predetermined number, and by obtaining a correlation coefficient between errors at a plurality of points by an ANN relational formula having a minimum error of the extracted ANN relational formula and errors at a plurality of points by an ANN relational formula except for the ANN relational formula having a minimum error of the ANN relational formula extracted more than N_ANN.

Alternatively, it may also be possible to extract N ANN relational formulae having a correlation coefficient, which is a predetermined reference value (e.g., 0.6 or 0.7) (including the ANN relational formula having a minimum error), by extracting a predetermined number of ANN relational formulae without extracting an ANN relational formula by comparing the errors of an estimated value of a geothermal gradient based on an ANN relational formula and an actually observed value, and then by obtaining a correlation coefficient between errors at a plurality of points by the ANN relational formula having a minimum error of the extracted ANN relational formulae and errors by other ANN relational formulae.

A method for estimating a geothermal gradient for an unknown point using calculated relational formula and correction formula is described, hereafter.

Figure 5:
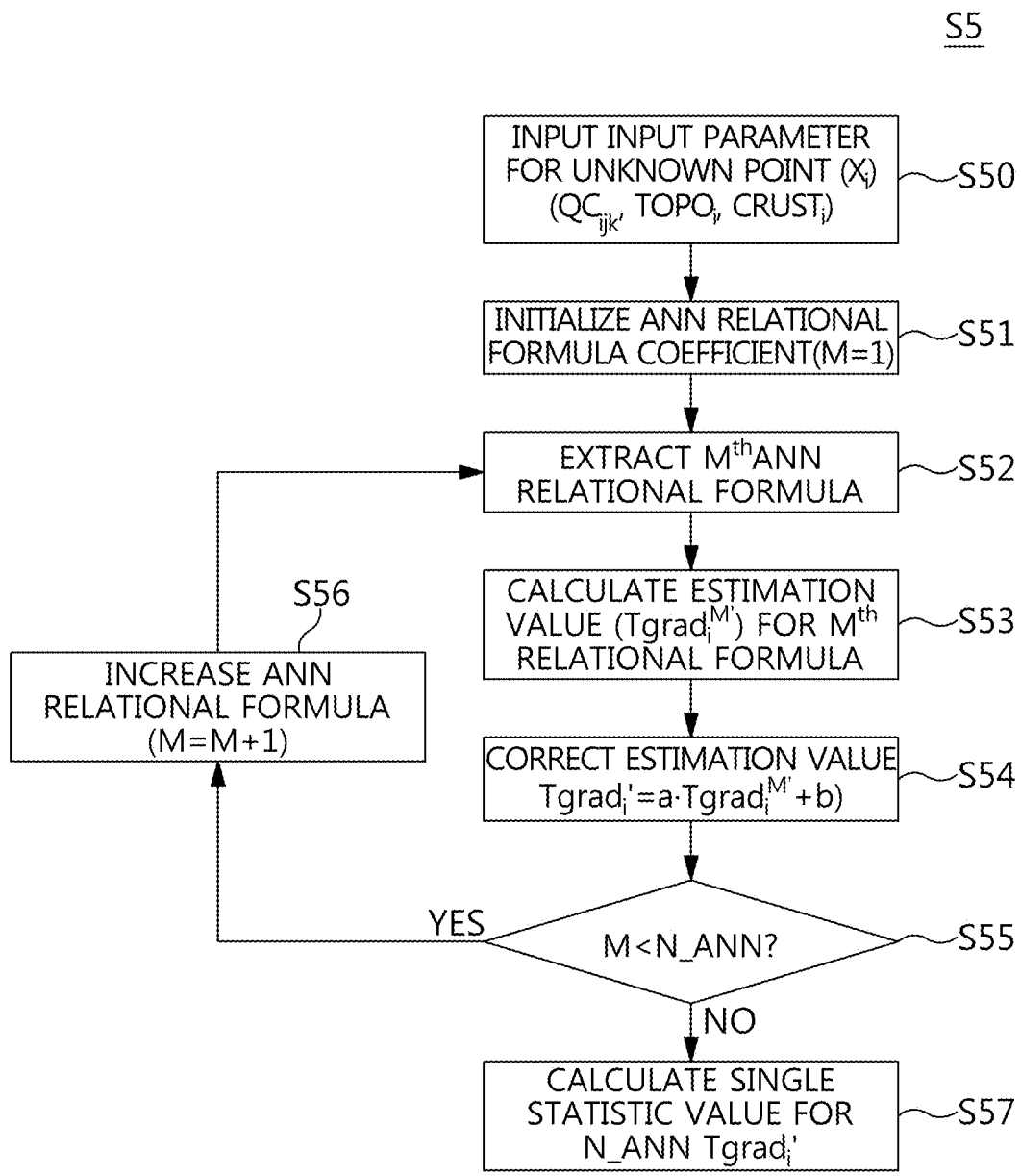
FIG. 5 is a view illustrating a method for estimating a geothermal gradient using an artificial neural network according to an embodiment of the present invention.

FIG. 5 is a view illustrating a method for estimating a geothermal gradient using an artificial neural network according to an embodiment of the present invention.

Referring to FIG. 5, a geothermal gradient for a predetermined location $x_i$ is estimated. First, seismic wave crustal attenuation characteristic, topographic characteristic, and crustal heterogeneity parameters are calculated and input as input parameters to an ANN (S50). The coefficient of the ANN is initialized (M=1) (S51).

Next, one of the ANN relational formulae calculated in FIG. 4 is extracted (S52) and a geothermal gradient estimation value $Tgrad_iM'$ for the extracted relational formula is calculated (S53). Further, the geothermal gradient estimation value is corrected using the correction formula calculated in step S48 of FIG. 4 (S54).

Whether the geothermal gradient estimation values were calculated as much as N_ANN that is the number of ANN relational formulae is determined by determining the number of times of calculation of the geothermal gradient estimation values. When it did not reach N_ANN (Yes in S55), the process returns to step S52 by increasing the coefficient and repeats steps S52 to S54.

On the other hand, when the number of times of calculation of the geothermal gradient estimation values reaches N_ANN (No in S55), it means that a total of N_ANN $Tgrad_i'$ were calculated, so a single statistic value for the calculated $Tgrad_i'$ is calculated (S57). The single statistic value may be the average value or the middle value of geothermal gradient estimation values. Accordingly, the final geothermal gradient estimation value for the unknown location $x_i$ is calculated.

Figure 6:
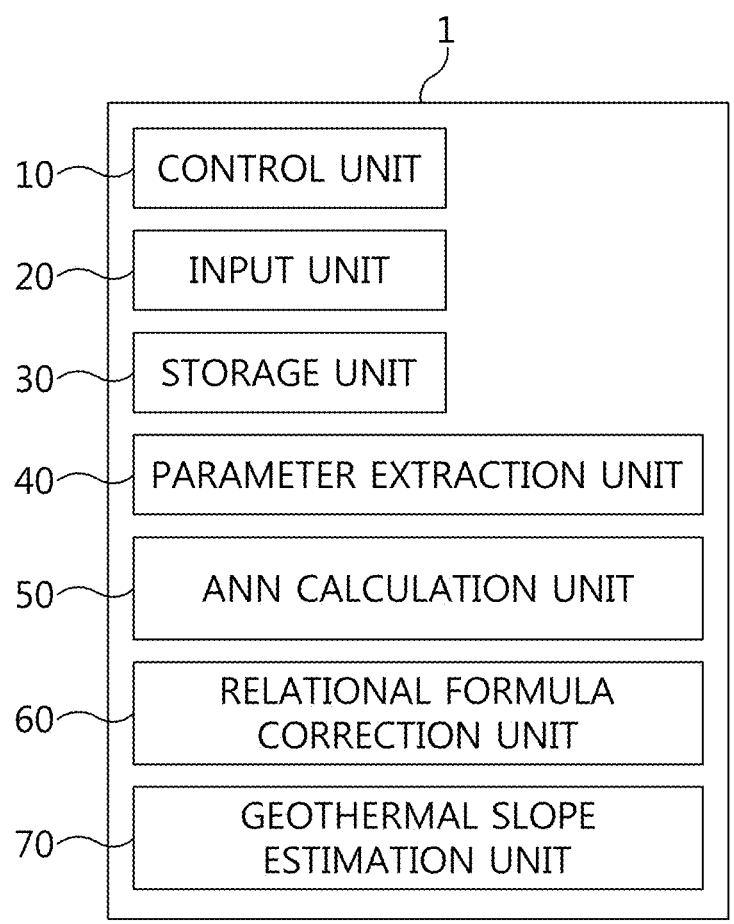
FIG. 6 is a view illustrating a device for estimating a geothermal gradient according to an embodiment of the present invention.

FIG. 6 is a view illustrating a device for estimating a geothermal gradient according to an embodiment of the present invention.

Referring to FIG. 6, a geothermal gradient estimation device 1 may include a control unit 10, an input unit 20, a storage unit 30, a parameter extraction unit 40, an ANN relational formula calculation unit 50, a relational correction unit 60, and a geothermal gradient estimation unit 70.

The control unit 10 controls general operation of the geothermal gradient estimation device 1 and controls components in the device.

The input device 20 is a part to which various data are input. The input unit 20 may be a part of which various items of information for extracting parameters are input. For example, the input unit 20, which is device for inputting seismic wave information, digital topographic map information, and other earth science information that are various items of information for extracting parameters by a user, may be a keyboard, a mouse, or a touch panel on a display image. Alternatively, when various items of information is input from the outside, the input unit 20 may be a communication device that is connected to an external wired/wireless and receives the information on the network, and may be an interface receiving information stored in a storage device such as an USB directly connected to the geothermal gradient estimation device 1>.

The storage unit 30 stores programs that are executed by the control unit 10 to operate the geothermal gradient estimation device 1. Further, the storage unit 30 can store information input through the input unit 20.

The parameter extraction unit 40 extracts various parameters related to geothermal heat from earth science information input through the input unit 20 or earth science information stored in the storage unit 30. The parameter extraction unit 40 extracts a wave crustal attenuation characteristic parameter from seismic information, a topographic character characteristic parameter from a digital topographic map, and a crustal heterogeneity parameter from other earth science information.

The seismic wave crustal attenuation characteristic parameter may include $Q_0$ and a frequency dependence value $\eta$ when anelastic attenuation of a seismic wave is modeled into $Q(f)=Q_0 f^\eta$. The $Q_0$ and a frequency dependence value $\eta$ can be calculated by a spectrum and a Q tomography inversion method based on measured seismic wave information for the geometric location and an in-crust depth of an area where seismic wave information is measured.

Furthermore, a function $F_\eta(Q_0)$ between the $Q_0$ and frequency dependency value $\eta$ calculated by the spectrum and Q tomography inversion method as a seismic wave crustal attenuation characteristic parameter, and a dependency difference $\eta\_diff$ ($\eta\_diff=\eta-\eta'$) that is the difference between a estimation value $\eta'$ of the frequency dependency value calculated from the function and the frequency dependency value $\eta$ calculated by the Q tomography inversion method may be further included.

The topographic characteristic parameter may include the height, relative height, slope, and roughness table for earth surface, etc. of an area of interest, and the crustal heterogeneity parameter may include the mantle depth and the crustal property of the area of interest.

The parameter extraction unit 40, for an interesting point where a geothermal gradient is actually wanted to estimate, extracts a seismic wave crustal attenuation characteristic parameter, a topographic characteristic parameter, and a crustal heterogeneity parameter, using earth science information of the corresponding point.

The ANN relational formula calculation unit 50 creates an ANN in which parameters extracted by the parameter extraction unit 20 are input and the geothermal gradient measured at the point that is a parameter extraction target as output. The ANN relational formula calculation unit 50 calculates an ANN relational formula while changing a network weight on the basis of input and output for a plurality of points. The relational formula that is calculated in this case is extracted when the error between a geothermal gradient estimation value calculated by substituting parameters into the relational formula and the geothermal gradient at a point that is the parameter extraction target is a predetermined reference value or less.

The ANN relational formula calculation unit 50 extracts the ANN relational formula as much as a predetermined number.

The relational formula correction unit 60 calculates a linear regression formula between geothermal gradient values calculated by inputting parameters at the points previously used into a plurality of ANN relational formulae calculated by the ANN relational formula calculation unit 50 and geothermal gradient values actually measured at the points from.

The geothermal gradient estimation unit 70 calculates a plurality of geothermal gradient estimation values of an area of interest by inputting a seismic wave crustal attenuation characteristic parameter, a topographic characteristic parameter, and a crustal heterogeneity parameter for the interesting point extracted by the parameter extraction unit 40 into the ANN relational formulae calculated by the ANN relational formula calculation unit 50.

The relational formula correction unit 60 corrects the geothermal gradient estimation values for the area of interest calculated by the geothermal gradient estimation unit 70, using the calculated linear regression formula.

When a plurality of geothermal gradient estimation values calculated by the geothermal gradient estimation unit 70 are corrected by the relational formula correction unit 60, the geothermal gradient estimation unit 70 calculates the final geothermal gradient estimation value by calculating statistic values such as an average value and a middle value using the corrected values. The final geothermal gradient estimation value by the statistic values calculated by the geothermal gradient estimation unit 70 is the geothermal gradient value at the interesting point where actual estimation is wanted.

By the method and configuration described above, it is possible to quantitatively and exactly estimate a geothermal gradient using only a seismic wave, a digital topographic map, and other earth science information without boring an exploratory hole with high expense, so it is possible to quantitatively estimate a geothermal characteristic such as geothermal temperature and geothermal heat flow of a deep part.

Furthermore, it is possible to estimate the geothermal characteristic of a wide area, so it is possible to efficiently use the geothermal characteristic in order to select a useful area for geothermal power generation from a deep part.

Alternatively, it is possible to use the geothermal characteristic in order to select a geothermal value that represents the area from a plurality of measured geothermal values even in an area where local geothermal gradient distortion is caused by water of a spa, etc.

Hereafter, a simulation result of actually estimating a geothermal gradient using the method for estimating a geothermal gradient described above is described.

FIGS. 7 to 12 are views showing results of estimating a geothermal gradient by simulating the method for estimating a geothermal gradient according to an embodiment of the present invention.

First, Fourier spectrum DB data for S-wave of seismic waves stored in Korean Earthquake Monitoring Station managed by KMA, KIGAM, and KEPRI, for earthquakes that occurred till December in 2012 in Korea were used to extract seismic wave crustal attenuation characteristic parameters. A relevant DB is composed of Fourier spectrums for horizontal S-wave period for 34,9417 earthquake records for a total of 632 earthquakes that occurred in Korea till December in 2012.

A seismic vibration ground motion can be expressed as a combination of a seismic source, seismic wave propagation, and a ground effect, and crustal attenuation characteristics can be separated only when models thereof are generally estimated. A stochastic point-source ground-motion model (Boore, 2003) that is suitable for high-frequency seismic wave over 1 Hz that is generally used around the world in relation to seismic wave characteristics was used. In this simulation, the stochastic point-source ground-motion model was selected, and seismic vibration ground motion model parameters were derived from seismic wave spectrum DB about earthquake observation and estimation values of the stochastic point-source ground-motion model on the basis of Korean earthquake observation data.

Figure 7:
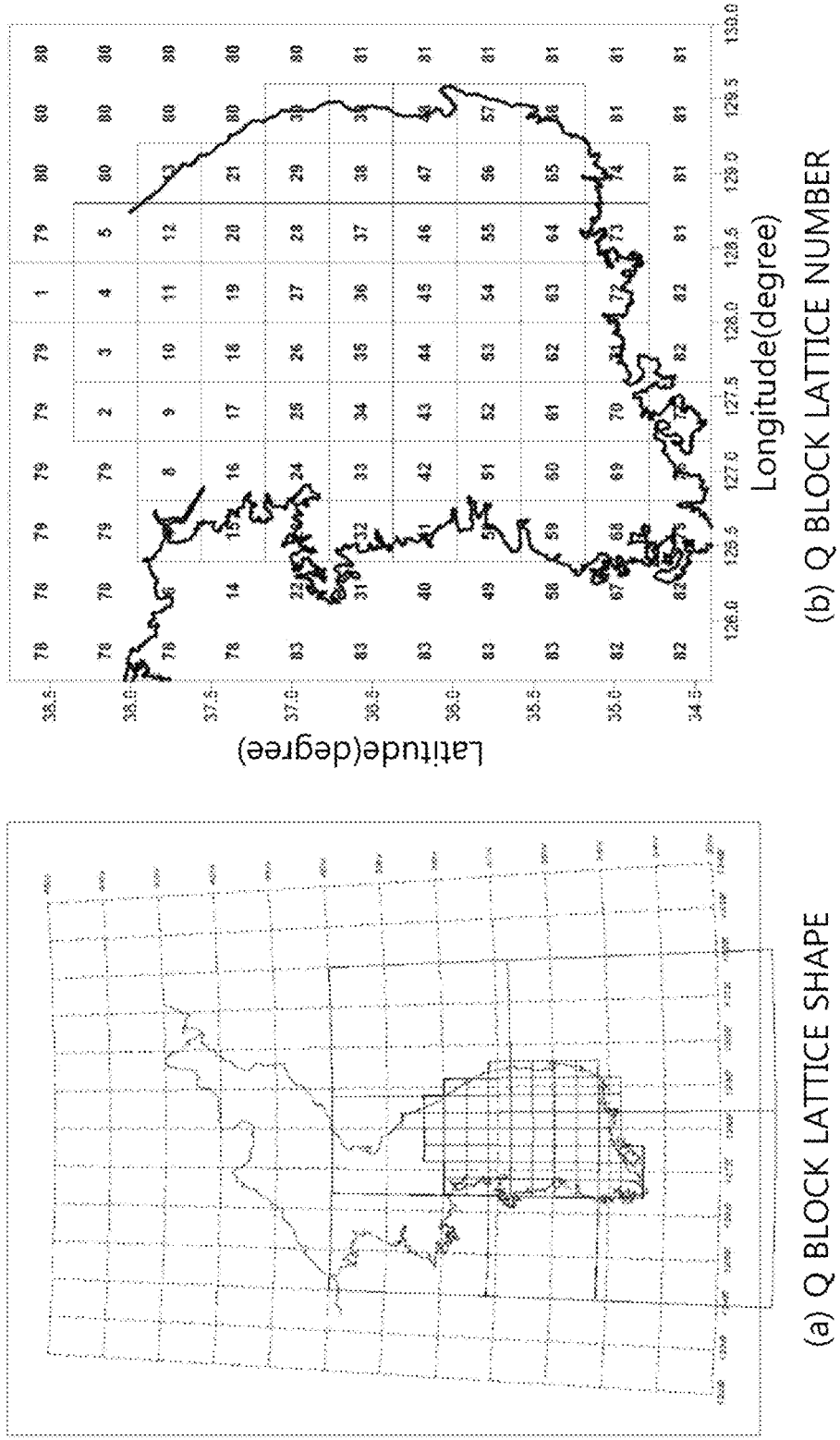
FIGS. 7 to 12 are views showing results of estimating a geothermal gradient by simulating the method for estimating a geothermal gradient according to an embodiment of the present invention.

The Korean land should be divided to estimate crustal attenuation characteristics for each area using Korean earthquake observation data, and to this end, a model dividing the southern part of Korean peninsula into eight three (seventy seven for the inland), as shown in FIG. 7, was used.

Further, since only an S-wave spectrum is used in this simulation, an index k related to the $k_{type}$ of a seismic wave in a crustal attenuation characteristic was set the maximum value 1 and the crustal depth of wave line was not considered, so an index J related to an in-crust depth $h_j$ of a wave line path was also set as 1.

When geothermal heat is latticed as shown in FIG. 7, $Q_0$ and a frequency dependency value $\eta$ that are crustal attenuation characteristic parameters represent the center points in each lattice. Furthermore, the maximum value of an index i related to the location of area of a specific point is seventy seven that is the number of the inland lattices.

Figure 8:
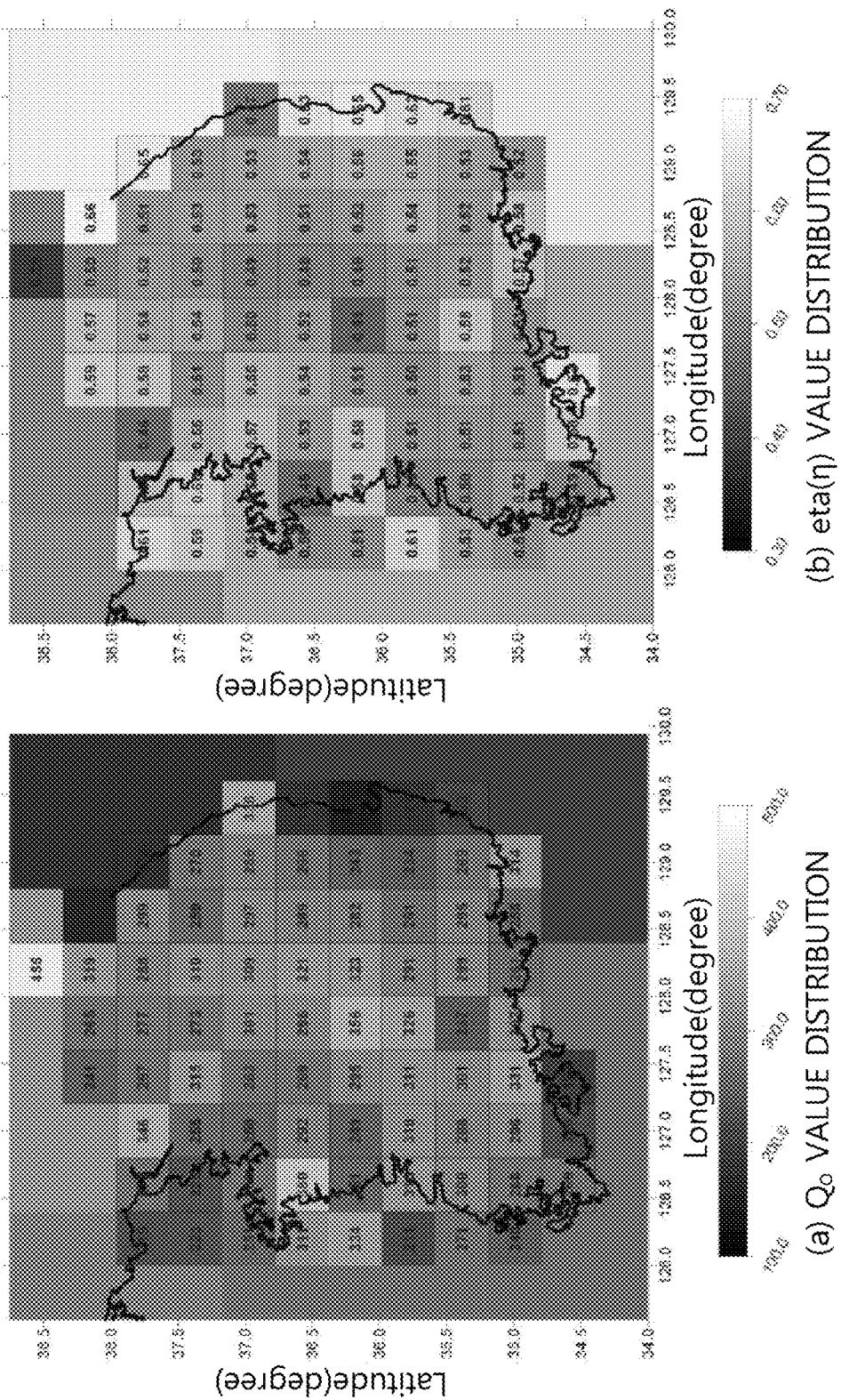

When inversion operation of the stochastic point-source ground-motion model is performed on the basis of the settings, $Q_0$ and $\eta$ can be calculated as shown in FIG. 8.

In FIG. 8, it is possible to calculate a function $F_\eta(Q_0)$ showing correlation between $Q_0$ and $\eta$ from the pair of $Q_0$ and $\eta$ for each derived point, which is as follows.

$$F_\eta(Q_0)=\eta(Q_0)=1.9305-0.248*\ln(Q_0)$$

Figure 9:
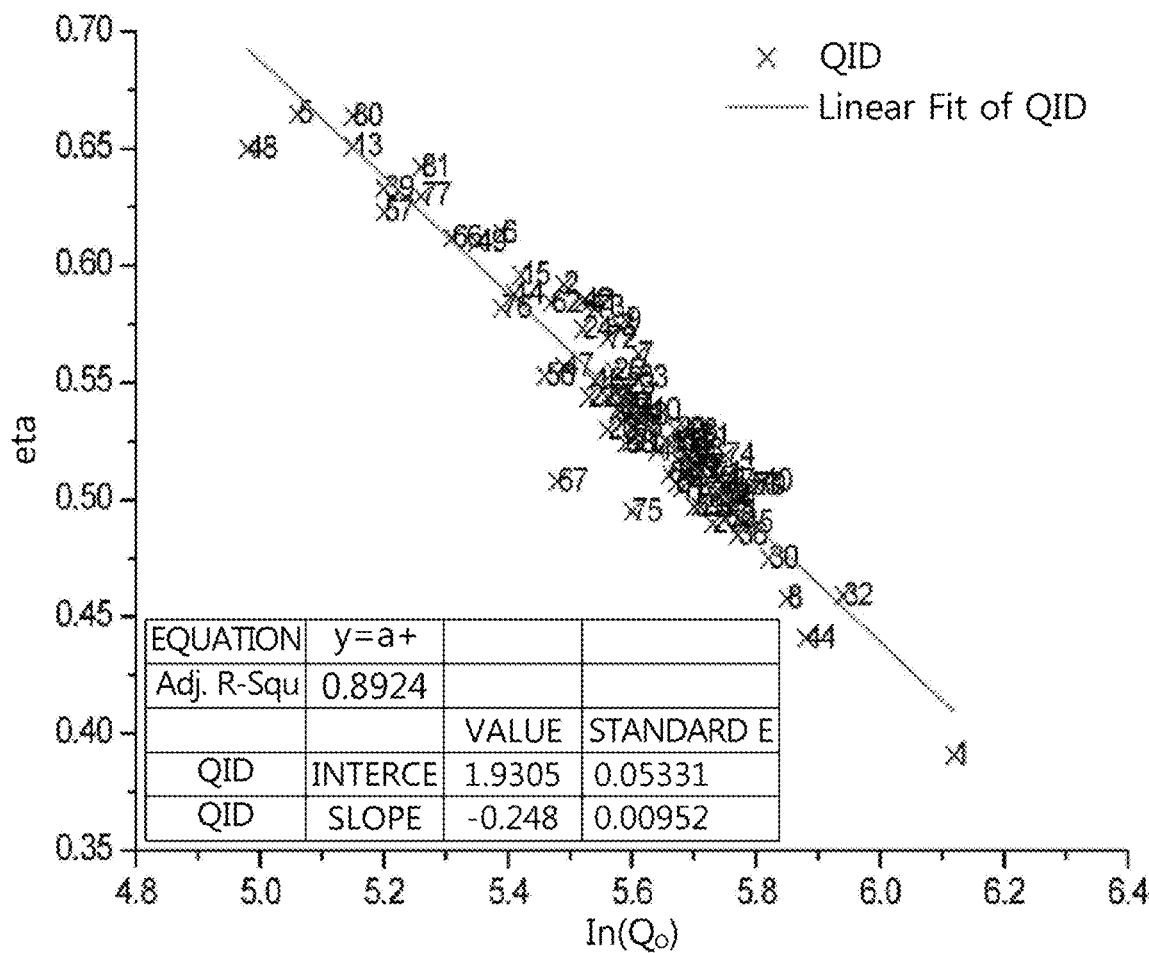

The function and the pair of $Q_0$ and $\eta$ are shown in FIG. 9. The horizontal axis is a natural logarithm value of $Q_0$ and the vertical axis is $\eta$ value in FIG. 9.

Figure 10:
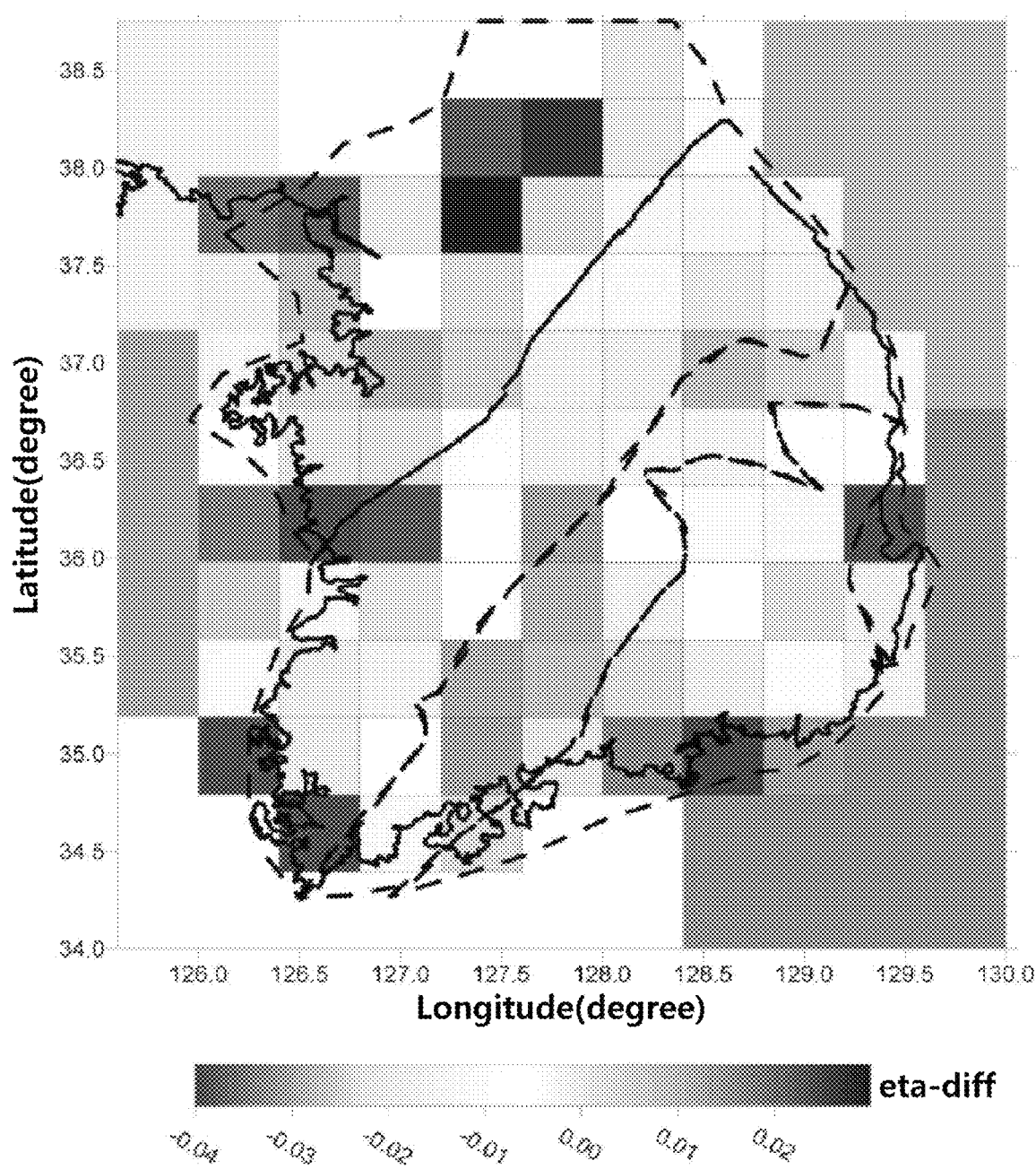
Figure 11:
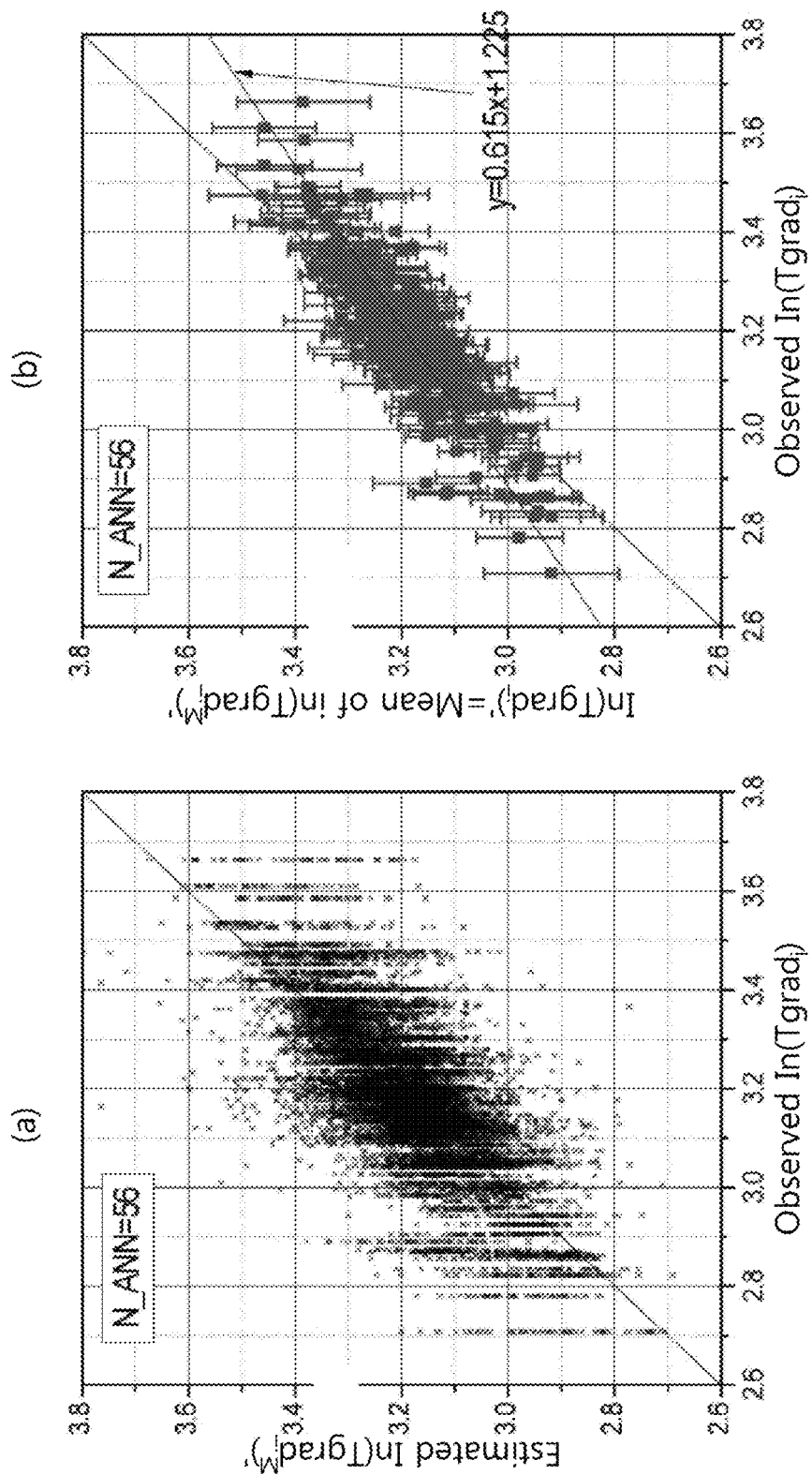

The dependency difference $\eta\_diff$ that is the difference between an estimated value $\eta'$ of a frequency dependency value calculated from the function $F_\eta(Q_0)$ and a frequency dependency value $\eta$ calculated by the Q tomography inversion method is obtained as shown in FIG. 10.

Next, a method used in this simulation to calculate crustal heterogeneity parameters as a topographic characteristic parameter and a parameter of other earth science information is described.

The topographic characteristic parameter was calculated on the basis of a digital topographic map, and an isostatic anomaly value and the mantle depth that are quantified for each area in published dissertations (Deformed structure of Moho plate of southern part of Korean Peninsular, Journal of Korean Earth Science, v. 27, no. 6, p. 620-642, December in 2006, SHIN, Young-Hong et al.) was used for the crustal heterogeneity parameter. The crustal heterogeneity parameter may include all earth science information that can be quantified at a specific point $x_i$, but only isostatic anomaly data that is obtained by gravity exploration was used in this simulation. Parameters used in this simulation are listed in detail as in Table 1.

TABLE 1

| Symbol | Item | Definition |
| --- | --- | --- |
| $S_i$ (slope) | Topographic characteristic parameter | Instantaneous topographic height at geothermal heat measurement point Slope (vector sum of theoretical slope in x and y directions of 3 D plane function suitable for height data with 1 km intervals in square area (16 × 16 km²)) |
| $H_i$ (height) | | Topographic height at geothermal heat measurement point |
| $Hr_i$ (relative height) | | Difference between maximum height ($Hmax_i$) and minimum height ($Hmin_i$) of area within radius of 8 km ($r_{max}$ = 8 km in FIG. 3) from geothermal heat measurement point, that is, $Hr_i = Hmax_i - Hmin_i$ |
| $top\_diff_i$ (roughness table for earth surface) | | Standard deviation of topographic height data ($H_i$ of 1.8 km interval ($\Delta r$ = 1.6 km in FIG. 3) in circular area at radius of 20 km from geothermal heat measurement point |
| $MAT_i$ (isostatic anomaly) | Crustal heterogeneity parameter | Isostatic anomly of gravity data by difference in density and thickness of crustal medium for each area |
| $D_i$ (mantle depth) | | Depth to mantle for each area |

An ANN relational formula was derived by the method describe with reference to FIG. 4, in which a seismic wave crustal attenuation characteristic parameter, a characteristic parameter, and a crustal heterogeneity parameter, which are parameters extracted as described above were input values, and a natural logarithm value ($\ln(Tgrad_i)$) of a measured geothermal gradient known at a specific point $x_i$ was an output value.

A Two Layer Feed-Forward (TLFF) method was used for the ANN and ten nodes were used for a hidden layer. Geothermal gradient data disclosed in non-patent document 1 were used for the geothermal gradient data that are output values in this simulation. Furthermore, natural logarithm values of corresponding data were used for $Q_{0i}$, slope $S_i$, height $H_i$, relative height $H_i$, of input parameters were used.

$\ln(Tgrad_i^{M'})$ estimated at corresponding points were compared using these parameters, an $\ln(Tgrad_i)$ value known at the specific point xi calculated by the method of FIG. 4, and fifth six ANN relational formulae calculated for N_ANN=56, which is shown in FIG. 11(a).

In calculation of an ANN relational formulae, a limit of an error was standard deviation=0.1, and linear bias of $\ln(Tgrad_i^{M'})$ for which an ANN relational formula is an estimation result was corrected using the following equation.

$$\ln(Tgrad_i') = 1.2629 * \ln(Tgrad_i^{M'}) - 0.8374$$

Meanwhile, FIG. 11(b) is a graph comparing an average value of fifth six estimation values $Tgrad_i^{M'}$ and a geothermal gradient value $\ln(Tgrad_i)$ known at a specific point xi, in which a primary regression function for removing linear function bias was also shown.

The standard deviation of an error for the data ($Tgrad_i^{M'}$) estimated in FIG. 11(a) was 0.1 but when an average value is applied, as in FIG. 11(b), the standard deviation of an error was improved by 30% to 0.068.

Figure 12:
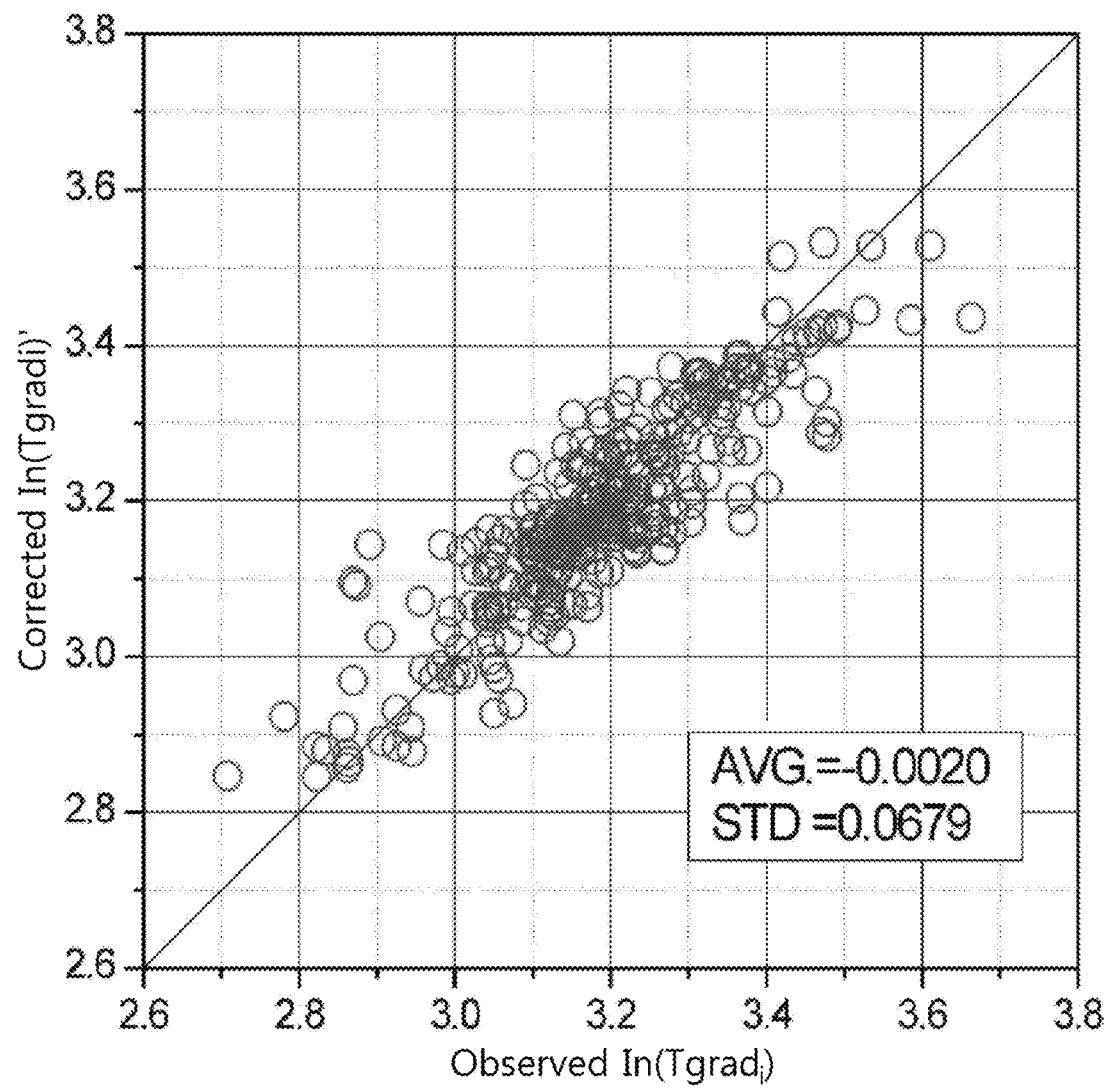

Accordingly, the final result of correcting linearity by applying the correction formula to the average value of the estimated data ($Tgrad_i^{M}$) was shown in FIG. 12. That is, the estimated error of the final geothermal gradient was 0.068.

As can be seen from the simulation result, it can be seen that a geothermal gradient value is calculated with high reliability, when an ANN is configured using a seismic wave crustal attenuation characteristic parameter and parameters of other earth science information related to geothermal heat and then a geothermal gradient of an area of interest is estimated from an ANN relational formula.

Specific execution described herein is embodiments and does not limit the present invention in any way. For briefness of the specification, electronic components, control systems, and software of the related art, and other functions of the system may not be described. Furthermore, wire connection and connecting members of components shown in the figures are examples of functional connection and/or physical or circuit connections, and in actual devices, they may be replaceable or may be shown as various additional functional connections, physical connections, or circuit connections. Unless stated in detail such as "necessary" and "important", they may not be necessary components for the present invention.

Terms "above" or other similar indicating terms used herein (particularly, claims) may indicate singular and plural terms. Furthermore, when a range is described herein, it includes an invention to which individual values within the range are applied, and (unless stated), it is the same as that the individual values of the range are described in the specification. Finally, unless orders of steps of the method according to the present invention or there is opposed description, the steps can be performed in appropriate order. The present invention is not limited to the described order of the steps. All example or exemplary terms (e.g., etc.) stated herein are used to described the present invention in detail and the range of the present invention is not limited to the terms unless they are limited by claims. It would be understood by those skilled in the art that the present invention may be configured in accordance with design conditions and factors within claims having various changes, combinations, and modifications or an equivalent range.

The invention claimed is:

1. A method for estimating a geothermal gradient, the method comprising calculating a seismic wave crustal attenuation characteristic parameter of a measured seismic wave at each of a plurality of points on the basis of seismic wave information measured for the plurality of points;
   deriving an artificial neural network relational formula on the basis of the seismic wave crustal attenuation characteristic parameter; and
   calculating a geothermal gradient of an area of interest except for the positions on the basis of the artificial neural network relational formula.

2. The method of claim 1, wherein the calculation of a seismic wave crustal attenuation characteristic parameter calculates $Q_0$ and a frequency dependence value η at a geometrical location and an in-crust depth of an area where the seismic wave information was measured, through a spectrum and a Q tomography inversion method based on the measured seismic wave information when anelastic attenuation of a seismic wave is modeled into $Q(f)=Q_0 f^\eta$.

3. The method of claim 2, wherein a dependency difference $\eta\_diff$ ($\eta\_diff=\eta-\eta'$) that is a difference between an estimation value $\eta'$ of the frequency dependency value calculated from a function $F_\eta(Q_0)$ between the $Q_0$ and frequency dependency value $\eta$ calculated by the Q tomography inversion method and the frequency independency value $\eta$ calculated by the Q tomography inversion method is additionally calculated in the calculation of a seismic wave crustal attenuation characteristic parameter.

4. The method of claim 1, further comprising calculating at least any one of a topographic characteristic parameter and a crustal heterogeneity parameter about the area of interest as the earth science information, and the deriving of an artificial neural network relational formula derives the artificial neural network relational formula by further including at least any one of the calculated topographic characteristic parameter or crustal heterogeneity parameter.

5. The method of claim 4, wherein the topographic characteristic parameter includes at least any one of a height, a relative height, a slope, and roughness table for the earth surface of the area of interest.

6. The method of claim 4, wherein the crustal heterogeneity parameter includes at least any one of a mantle depth and a crustal property of the area of interest.

7. The method of claim 4, wherein the deriving of au artificial neural network relational formula drives the artificial neural network relational formula by using the seismic wave crustal attenuation characteristic parameter, the topographic characteristic parameter, and the crustal heterogeneity parameter about the plurality of points as input of the artificial neural network relational formula and by using geothermal gradients measured for the plurality of points as output, and the calculation of a geothermal gradient calculates a geothermal gradient of the area of interest by calculating a seismic wave crustal attenuation characteristic parameter, a topographic characteristic parameter, and a crustal heterogeneity parameter at the area of interest and substituting the parameters into the derived artificial neural network relational formula.

8. A method for estimating a geothermal gradient, the method comprising:

configuring an artificial neural network relational formula by using a seismic wave crustal attenuation characteristic parameter, a topographic characteristic parameter, and a crustal heterogeneity parameter calculated about a plurality of points as input of the artificial neural network and by using geothermal gradients measured for the plurality of points as output of the artificial neural network;

calculating artificial neural network relational formulae, in which a relationship between the measured geothermal gradients and a geothermal gradient value calculated on the basis of an artificial neural network satisfies a predetermined condition, as much as a predetermined number;

calculating a plurality of geothermal gradient estimation values by inputting a seismic wave crustal attenuation characteristic parameter, a topographic characteristic parameter, and a crustal heterogeneity parameter at an area of interest except for the plurality of joints, into the calculated artificial neural network relational formulae; and calculating a final geothermal gradient estimation value by calculating a statistic value for the plurality of geothermal gradient estimation values.

9. The method of claim 8, further comprising calculating a linear regression formula between the measured geothermal gradient values and geothermal gradient values calculated by inputting the parameters at the plurality of points into the calculated artificial neural network relational formulae.

10. The method of claim 8, wherein the predetermined condition means that an error between the measured geothermal gradient and a geothermal gradient calculated on the basis of an artificial neural network is a first reference value or less.

11. The method of claim 9, wherein the predetermined condition means that a correlation coefficient for a geothermal gradient value calculated by an artificial neural network relational formula having a minimum error of artificial neural network relational formulae satisfying the condition that the error is the first reference value or less.

12. The method of claim 8, wherein the predetermined condition means that a correlation coefficient for a geothermal gradient value calculated by an artificial neural network relational formula having a minimum error of a plurality of artificial neural network relational formulae calculated by artificial neural network repetitive learning is a second reference value or less.

13. A device for estimating a geothermal gradient, the device comprising:

a parameter extraction unit extracting a parameter showing a characteristic of input information;

an artificial neural network relational formula calculation unit calculating an artificial neural network relational formula having the parameter calculated by the parameter extraction unit as input; and a geothermal gradient estimation unit calculating a geothermal gradient estimation value by inputting parameters at an area of interest extracted by the parameter extraction unit into an artificial neural network relational formula calculated by the artificial neural network relational formula calculation unit, wherein the parameter extracted by the parameter extraction unit includes a seismic wave crustal attenuation characteristic parameter, a topographic characteristic parameter, and a crustal heterogeneity parameter, and the artificial neural network relational formula calculation unit calculates the artificial neural network relational formula on the basis of parameters extracted at a plurality of points by the parameter extraction unit and geothermal gradients measured at the plurality of points.

* * * * *